(12) United States Patent
Hiremath

(10) Patent No.: US 10,882,429 B2
(45) Date of Patent: Jan. 5, 2021

(54) HEAD RESTRAINT ARRANGEMENT WITH A DISPLACEABLE ACTUATING ELEMENT

(71) Applicant: Brose Fahrzeugteile GmbH & Co. Kommanditgesellschaft, Coburg, Coburg (DE)

(72) Inventor: Chetan Hiremath, Coburg (DE)

(73) Assignee: BROSE FAHRZEUGTEILE GMBH & CO. KOMMANDITGESELLSCHAFT, COBURG, Coburg (DE)

(*) Notice: Subject to any disclaimer, the term of this patent is extended or adjusted under 35 U.S.C. 154(b) by 0 days.

(21) Appl. No.: 16/340,360

(22) PCT Filed: Oct. 11, 2017

(86) PCT No.: PCT/EP2017/075876
§ 371 (c)(1),
(2) Date: May 8, 2019

(87) PCT Pub. No.: WO2018/069363
PCT Pub. Date: Apr. 19, 2018

(65) Prior Publication Data
US 2020/0062155 A1    Feb. 27, 2020

(30) Foreign Application Priority Data
Oct. 11, 2016   (DE) .......................... 10 2016 219 765

(51) Int. Cl.
*B60N 2/815*    (2018.01)
*B60N 2/865*    (2018.01)

(52) U.S. Cl.
CPC ............. *B60N 2/815* (2018.02); *B60N 2/865* (2018.02)

(58) Field of Classification Search
CPC ........ B60N 2/815; B60N 2/865; B60N 2/812; B60N 2/806; B60N 2/809
USPC ......................................................... 297/410
See application file for complete search history.

(56) References Cited

U.S. PATENT DOCUMENTS

| 3,230,595 | A  |   | 1/1966 | Kedem |
| 6,899,395 | B2 | * | 5/2005 | Yetukuri ................. B60N 2/85 |
|           |    |   |        | 297/408 |
| 8,939,512 | B2 | * | 1/2015 | Boes ..................... B60N 2/809 |
|           |    |   |        | 297/408 |

(Continued)

FOREIGN PATENT DOCUMENTS

| DE | 102004005705 A1 | 9/2005 |
| DE | 102008024275 A1 | 12/2008 |

(Continued)

*Primary Examiner* — Mark R Wendell
(74) *Attorney, Agent, or Firm* — Lewis Roca Rothgerber Christie LLP

(57) ABSTRACT

It is provided a head restraint arrangement for a vehicle seat, with a head restraint which is adjustable along two spatial axes and with an actuating device, by means of which at least one locking device which, in a locked state, blocks the head restraint against adjustment in at least one spatial direction along one of the spatial axes, is manually actuatable in order to remove a block and to permit an adjustment of the head restraint. The actuating device comprises an actuating element which is provided on the head restraint and, for actuation of the locking device, is mounted displaceably along at least one of the spatial axes.

16 Claims, 10 Drawing Sheets

(56) References Cited

U.S. PATENT DOCUMENTS

| | | | |
|---|---|---|---|
| 2008/0296953 A1 | 12/2008 | Veine et al. | |
| 2010/0072791 A1* | 3/2010 | Brunner | B60N 2/856 297/61 |
| 2011/0006578 A1* | 1/2011 | Veine | B60N 2/818 297/410 |
| 2011/0109143 A1* | 5/2011 | Maddelein | B60N 2/865 297/404 |
| 2012/0080926 A1* | 4/2012 | Fey | B60N 2/818 297/410 |
| 2013/0134761 A1* | 5/2013 | Willard | B60N 2/856 297/408 |
| 2014/0145489 A1 | 5/2014 | Wang et al. | |

FOREIGN PATENT DOCUMENTS

| | | |
|---|---|---|
| EP | 1136313 A1 | 9/2001 |
| JP | 59-62016 | 4/1984 |

\* cited by examiner

HEAD RESTRAINT ARRANGEMENT WITH A DISPLACEABLE ACTUATING ELEMENT

CROSS-REFERENCE TO A RELATED APPLICATION

This application is a National Phase Patent Application of International Patent Application Number PCT/EP2017/075876, filed on Oct. 11, 2017, which claims priority of German Patent Application Number 10 2016 219 765.7, filed on Oct. 11, 2016, the entire contents of all of which are incorporated herein by reference.

BACKGROUND

The disclosure relates to a head restraint arrangement for a vehicle seat.

In head restraint arrangements for a vehicle seat known hitherto from practice, a head restraint which is provided on a backrest of a vehicle seat is generally adjustable along two spatial axes. In this manner, the head restraint is able to be set in terms of its height and an adjustment of the inclination of the head restraint and/or a forward displacement of the head restraint is also possible. In the latter case, the head restraint may be adjusted relative to the backrest, for example, to the front and to the rear in order to predetermine the best possible support position for the rear of the head of a seat user.

In order to block the head restraint in an adopted adjusted position, at least one locking device is provided, in a locked state said locking device blocking the head restraint against an adjustment relative to the dorsal line. In order to remove a block and to permit an adjustment of the head restraint in a specific spatial direction, generally an actuating device is provided. The locking device may be acted upon by means of the actuating device and said locking device may be actuated in order to release a locking and thus in order to be able to adjust the head restraint manually.

In FIGS. 9A and 9B a head restraint arrangement known from the prior art is illustrated by way of example. In this case a head restraint KS of a vehicle seat F is adjustable on a backrest R along two spatial axes X and Z. These spatial directions X and Z extend relative to an XYZ vehicle seat coordinate system, in the case of the Z-axis substantially vertically and in the case of the X-axis substantially horizontally. As a result, a height of the head restraint KS is set on the upper face of the backrest R in the two opposing spatial directions along the Z-axis. As a result, the head restraint KS may be displaced further to the front or further to the rear in the two opposing spatial directions along the X-axis.

An actuating element in the form of an actuating knob B is provided on a side surface SF of the head restraint KS. This actuating knob B may be actuated manually along a spatial axis Y extending perpendicular to the X-axis or the Z-axis in an actuating direction By. If the actuating knob B is pressed in the actuating direction By, a locking device is actuated thereby, in the locked state said locking device blocking the head restraint KS in both spatial directions X and Z against an adjustment. As long as the actuating knob B remains pressed, the head restraint KS may be adjusted along both spatial axes X and Y in its position relative to the backrest R.

In the case of a previous conventional head restraint arrangement corresponding to FIGS. 9A and 9B, the adjustment of the head restraint KS by a user is frequently perceived as inconvenient and disadvantageous from an ergonomic point of view. Moreover, by the release of the locking for both spatial axes X and Z, an adjustment may be carried out inadvertently along one of the spatial axes X or Z, although a user actually wishes to adjust the head restraint KS only along a specific spatial axis X or Z. For example, it may arise that when setting the height of the head restraint KS along the spatial axis Z a user inadvertently also alters the relative position thereof along the spatial axis X.

SUMMARY

The object underlying the proposed solution, therefore, is to provide a head restraint arrangement for a vehicle seat which is improved in this regard.

This object is achieved by a head restraint arrangement with features as described herein.

According to the proposed solution, this head restraint arrangement provides an actuating device comprising an actuating element which is provided on the head restraint and, for actuation of a locking device, in a locked state the head restraint being blocked thereby against an adjustment in at least one spatial direction along one of the spatial axes, is mounted displaceably along at least one of the spatial axes along which the head restraint itself is also adjustable. As a result, a displaceable actuating element is provided for unlocking the locking device, said actuating element having to be displaced along at least one of the spatial axes, along which in principle an adjustment of the head restraint may also be carried out. Relative to the above-described exemplary embodiment of FIGS. 9A and 9B for a head restraint arrangement known from the prior art, for example, this means that a corresponding actuating element may be displaced along the spatial axis Z upwardly and/or downwardly and alternatively or additionally along the spatial axis X to the front and/or to the rear in order to permit an adjustment of the head restraint KS.

Via the head restraint arrangement according to the proposed solution, therefore, an intuitively actuatable actuating device is provided. An actuating element of this actuating device is mounted displaceably on the head restraint itself, for example on a (right-hand or left-hand) side surface of the head restraint. In this case, in order to actuate a locking device a corresponding actuating element on this side surface does not necessarily have to be pressed in. Instead, the actuating element is primarily displaceable in a plane of the side surface in order to actuate the locking device. Whilst a possible pressing-in of the actuating element perpendicular to the plane of the side surface may also be permitted, this does not serve (solely) for unlocking the head restraint.

In a variant, the actuating element is displaceable along both spatial axes, the head restraint in principle also being able to be set in its adjusted position along said spatial axes. Depending on whether the head restraint is intended to be adjusted along the one or the other spatial axis, in this case the actuating element may also be displaced only along one of the two spatial axes in order to actuate the at least one locking device. Thus depending on an actuating direction of the actuating element and thus depending on the spatial direction in which the actuating element is displaced, the actuating device may selectively permit only an adjustment of the head restraint along a specific spatial axis of the two possible spatial axes.

It is provided that for actuating the at least one locking device the actuating element may be displaceable along the spatial axis along which the head restraint is adjustable in an unlocked state of the locking device. The actuating element may be thus displaced upwardly or downwardly in order to permit an adjustment of the head restraint upwardly and/or downwardly and, as a result, in order to permit setting the head restraint height relative to the backrest of the vehicle seat.

In a variant, for actuating the locking device the actuating element is displaceable along a spatial axis in the spatial direction in which the head restraint is adjustable in an unlocked state of the locking device. In this case, therefore, the actuating element is displaced in the spatial direction in which a user then wishes to adjust the head restraint manually, as soon as the locking device permits the adjustment of the head restraint.

Alternatively or additionally, for actuating the locking device the actuating element may be displaceable along a spatial axis in a spatial direction which runs opposite the spatial direction in which the head restraint is adjustable in an unlocked state of the locking device. In this variant an actuating element may be displaceable upwardly on the head restraint in order to release an adjustment of the head restraint downwardly. This variant is also able to be combined with the above-described variant so that then an actuating element may be displaceable along a first spatial axis in the spatial direction in which the head restraint is adjustable after releasing the locking. At the same time, for releasing an adjustment of the head restraint the actuating element may be displaceable along a second spatial axis running perpendicular to the first spatial axis, counter to the spatial direction in which the head restraint is manually adjustable after releasing the locking. In this regard, a head restraint arrangement according to the solution has maximum flexibility and may be adapted to different comfort requirements, wherein via the displaceable mounting of the actuating element already a marked increase in convenience may be achieved for the user.

In a locked state, the at least one locking device may also block the head restraint along a spatial axis merely against an adjustment in one of two opposing spatial directions. Thus, it may be provided that the head restraint is blocked in a spatial direction, in an adopted adjusted position relative to both spatial directions. For an adjustment in a (first) spatial direction, however, no previous actuation of a locking device is required via the actuating element. Here, a corresponding action of force is sufficient on the head restraint itself in order to adjust said head restraint. A conventional example of an application is a head restraint which is adjustable upwardly or to the front without the previous actuation of a locking device, whereas a lowering of the head restraint and an adjustment to the rear is additionally secured and first requires the previous actuation of a locking device. This is intended to ensure that, for example, in the event of a crash the head restraint is not able to be pushed downwardly or to the rear solely by a force of the head acting on the head restraint and thus increasing the risk of injury to the seat user.

In principle, however, naturally it may be provided that in a locked state the at least one locking device blocks the head restraint along one spatial axis against an adjustment in both opposing spatial directions along a spatial axis. As a result, in this case a release always has to be implemented via the actuating device in order to be able to adjust the head restraint in one of the two possible spatial directions.

The actuating element may be mounted displaceably via at least one sliding guide. Such a sliding guide has a guiding slide on the actuating element and at least one guide element arranged in the guiding slide, wherein by the cooperation of the guiding slide and the at least one guide element a defined adjustment path is predetermined for the actuating element in order to actuate the locking device. In a variant, however, the actuating element is mounted displaceably via a sliding guide, by a guide element which is provided on the actuating element or on a component of the actuating device, which is fixed to the actuating element or configured integrally therewith, being mounted displaceably on a guiding slide of the sliding guide.

In a variant, the actuating element is pretensioned via at least one spring element into a neutral position from which the actuating element has to be displaced for actuating the at least one locking device in order to remove a block. As a result, the actuating element is pretensioned in a neutral position in which the locking device is locked. In this manner, the locking device automatically changes into a blocked position when a user no longer acts on the actuating element. Then the actuating element is readjusted into a neutral position via the at least one spring element so that the locking device adopts a locked state once again. Moreover, it is also ensured that the locking device does not remain inadvertently actuated. A user always has to undertake a displacement of the actuating element counter to a restoring force of the at least one spring element in order to be able to unlock the at least one locking device and to adjust the head restraint.

With an actuating element which is displaceable along both spatial axes, along which the head restraint is also adjustable, the actuating element may be pretensioned into the neutral position by means of at least two spring elements. As a result, a first spring element pretensions the actuating element along the one (first) spatial axis into the neutral position, whilst the other (second) spring element pretensions the actuating element along the other (second) spatial axis into the neutral position.

In an embodiment, a spring element is supported, or spring elements assigned to at least two different spatial axes are supported, on a mounting element of the actuating device.

Such a mounting element may surround at least the actuating element with a portion in the manner of a frame and serves for fixing the actuating device to the head restraint. Such a mounting element in this case may be part of a premounted subassembly of the head restraint arrangement on which the actuating device is premounted with the actuating element so that the actuating element is already displaceably held on the mounting element before it is mounted on the head restraint. The premounted subassembly is then merely mounted on the head restraint and coupled to the locking device, which is already provided thereon or is still to be retrospectively mounted, in order to be able to actuate this locking device via the actuating device.

A coupling to the locking device may be carried out via at least one flexible traction means. By means of the at least one traction means, for the actuation of the locking device an adjusting force which is manually applied to the actuating element is able to be transmitted to the at least one locking device in order to remove the block via the locking device. As a result, by displacing the actuating element, a pulling force is transmitted via the traction means to the locking device which ultimately leads to a locking of the head restraint being released. The at least one traction means in this case may comprise a Bowden cable.

In a variant, the actuating element may be arranged in an opening or a cup-shaped recess of a bearing element of the actuating device. This opening or recess may be dimensioned relative to the actuating element, such that a user may reach with the fingers of one hand into the opening or recess in order to act on the actuating element. The bearing element in this case may form, via the opening or recess, a grip recess into which a user may reach for displacing the actuating element. In a variant, via this grip recess it is predetermined on the head restraint, may be on a side surface of the head restraint, and also a point on the head restraint, at which a user is intended to act in order to adjust the head restraint itself. By reaching into the opening or recess of the bearing element, therefore, a user on the one hand may manually displace the actuating element and on the other hand—after unlocking the locking device—at the same time also adjust the head restraint itself relative to the backrest.

The displacement of the actuating element takes place relative to the bearing element, or together with the bearing element, i.e. the actuating element is adjustably mounted either relative to the bearing element forming the opening or recess, or fixedly connected thereto. In this manner, for actuating the locking device the actuating element is displaced relative to the bearing element or the bearing element is displaced with the actuating element, for may be relative to a mounting element which surrounds the bearing element in the manner of a frame, with the actuating element arranged in the opening or recess thereof.

In a variant with an actuating element which is arranged in an opening or recess of a bearing element and which is mounted displaceably relative to this bearing element, on a wall edging the opening or recess the bearing element forms an aperture through which a portion of the actuating element is displaceable out of the opening or recess in order to actuate the locking device. The aperture in this case may be configured as a through-opening on a wall of the bearing element, through which the actuating element in a neutral position protrudes into the opening or recess.

In a development, the through-opening has a C-shaped, L-shaped, U-shaped or V-shaped path so that the through-opening extends at least partially in two spatial directions and a displacement of the actuating element is possible by utilizing the through-opening substantially perpendicular to these two spatial directions. The through-opening may extend in a corner of a rectangular recess or opening of a bearing element on two walls of the recess or opening, so that the actuating element may be displaced at least partially through this through-opening, on the one hand, to the right and/or left and, on the other hand, upwardly and/or downwardly, in order to actuate the locking device. By the at least partial displaceability of the actuating element out of the opening or recess of the bearing element, an ergonomic and aesthetically attractive design of the actuating device is equally facilitated.

It may also be provided that the bearing element or an element of the actuating device connected rigidly to the actuating element or configured therewith forms a guide element, for example in the form of a sliding block or in the form of a guide pin, which is slidably guided in a guiding slide of a sliding guide for the displaceable mounting of the actuating element.

In a development based thereon the guiding slide, in which a guide element of the bearing element or an element connected rigidly to the actuating element or configured therewith is slidably guided, is configured on a mounting element of the actuating device. As a result, in this case the guiding slide is then configured on a component of the actuating device which surrounds at least the actuating element—optionally also the bearing element connected thereto—with a portion in the manner of a frame and/or the actuating device being fixed thereby to the head restraint.

In an embodiment, a guiding slide of the sliding guide has at least two slide portions extending substantially perpendicular to one another. By at least two slide portions extending perpendicular to one another, via the sliding guide an adjustability of the actuating element may be provided along two spatial axes perpendicular to one another.

Depending on the desired degree of adjustability of the actuating element the guiding slide may have different paths. Depending on the desired option for unlocking and thus the displaceability of the actuating element, for example, a guiding slide may be provided in at least one region with an H-shaped, h-shaped, F-shaped, U-shaped or double cross-shaped path. In this case, a double cross-shaped path of a guiding slide also encompasses the guiding slide extending in at least one region in an H-shaped, h-shaped, F-shaped or U-shaped manner. Via a double cross-shaped or at least partially double cross-shaped path of a guiding slide, via a guide element or a plurality of guide elements which is/are slidably guided in the guiding slide, a more complex displacement movement of the actuating element and/or a plurality of options for unlocking may be provided in a relatively simple manner.

BRIEF DESCRIPTION OF THE DRAWINGS

The accompanying figures illustrate by way of example possible variants of the proposed solution.

FIGS. 9A-9B show a head restraint arrangement known from the prior art with an actuating device which has an actuating knob which may be pressed in.

DETAILED DESCRIPTION

Figure 1A:
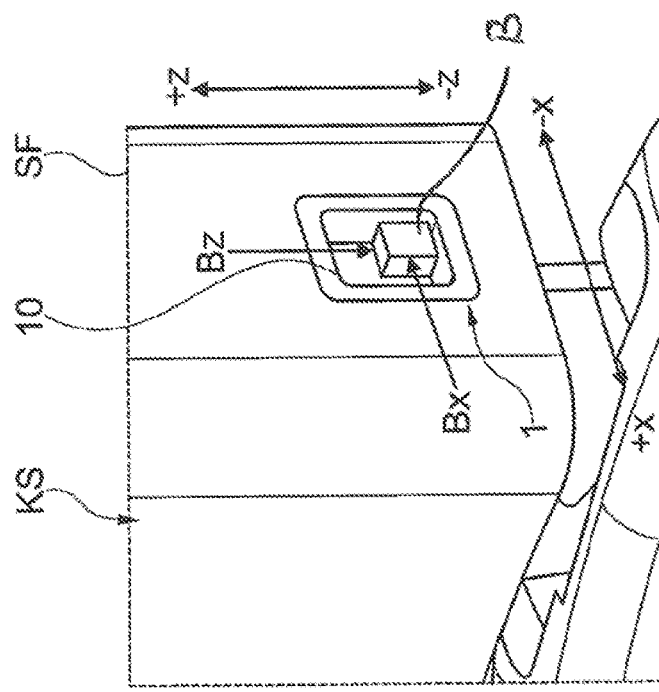
FIG. 1A shows an enlarged view of FIG. 1.
Figure 1:
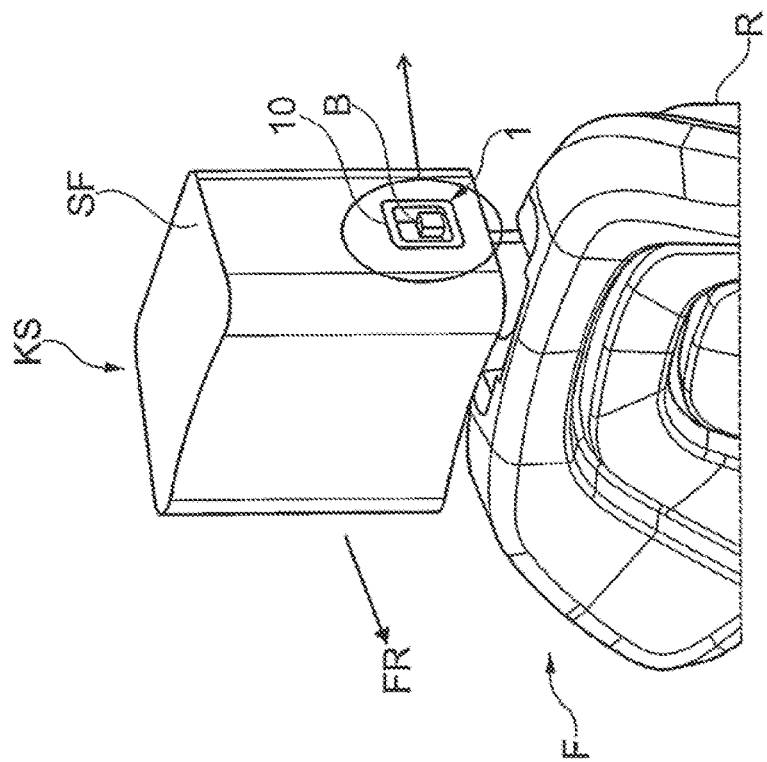
FIG. 1 shows a first variant of a head restraint arrangement with an actuating element mounted displaceably on a side surface of the head restraint in the form of an actuating knob.

In FIG. 1 a detail of a vehicle seat F is illustrated, said vehicle seat having on an upper end of a backrest R a head restraint arrangement with an adjustably mounted head restraint KS. The head restraint KS in this case is adjustably mounted along two spatial axes X and Z which are perpendicular to one another in an XYZ vehicle seat coordinate system so that the head restraint KS may be adapted to the height of a seat user and to this end may be adapted both in its height and its longitudinal position. In this case an adjustment of the height of the head restraint KS is possible along the spatial axis Z in order to be able to adjust the head restraint KS in a +z direction upwardly and a −z direction downwardly. Along the spatial axis X the head restraint KS may be adjusted in the +x direction to the front and in the −x direction to the rear. In a state of the vehicle seat F correctly installed in a vehicle, the spatial axis X thus extends parallel to a (forward) direction of travel FR of the vehicle.

The adopted adjustment position of the head restraint KS relative to the backrest R is blocked via a conventional locking device, not shown in more detail here. Such a locking device, for example, defines positive latching connections between the upholstered parts of the head restraint and support clips fixed to the backrest R. For adjusting the head restraint KS, this locking device is able to be actuated specifically via an actuating device 1 in order to remove a block of the head restraint KS and to permit an adjustment. As a result, an unlocking of the head restraint KS may be undertaken by means of the actuating device 1 so that a user may manually adjust the head restraint KS.

In the variant illustrated with reference to FIGS. 1 and 1A (wherein FIG. 1A shows an enlarged detail of FIG. 1) the actuating device 1 comprises an actuating element arranged on a side surface SF of the head restraint KS in the form of an actuating knob B, via which a user may manually release the locking device. In this case, contrary to the actuating devices known hitherto from practice, the actuating knob B is not able to be pressed in but only displaceably provided on the side surface SF. The actuating knob B in this case rests in a bearing element of the actuating device 1 configured as a bearing cup 10, so that the actuating knob B is recessed on the side surface SF, terminating flush with the one edge of the bearing head 10. A user may, therefore, reach into the bearing cup 10 in order to apply a force onto the actuating knob B.

The actuating knob B is displaceable along the spatial axes X and Z in order to release a locking of the head restraint KS and to permit an adjustment specifically in these spatial directions X and Z. Via the actuating device 1 a locking of the head restraint KS may be unlocked more intuitively since the actuating knob B is displaced along the spatial axes X and Z in which an adjustment of the head restraint KS is also intended to be permitted. The actuating knob B in this case is displaceable from a neutral position along both spatial axes X and Z, in each case only in one spatial direction −x and −z, in order to release selectively a locking of the head restraint KS so that an adjustment is possible either along the X-axis or the Z-axis. If, as a result, the actuating knob B is displaced in an actuating direction Bx along the X-axis (in the −x direction) the head restraint KS is also able to be set in its longitudinal position only along the corresponding spatial axis X. If, however, the actuating knob B is displaced in an actuating direction Bz (downwardly in the −z direction) along the Z-axis, the head restraint KS may be adjusted only along the corresponding spatial axis Z and set in terms of its height. In this manner, a user who wishes to set the head restraint KS along one of the spatial axes X or Z is prevented from also inadvertently altering an adjusted position of the head restraint KS relative to the other spatial axis Z or X. In the variant shown, therefore, it is provided that via the actuating device 1 the adjustment of the head restraint KS along one of the spatial axes X or Z is released to a maximum extent, whilst the head restraint KS remains blocked against an adjustment along the other spatial axis Z or X.

The actuating device 1 is illustrated in more detail with reference to FIGS. 2A and 2B, in particular illustrated in these figures is a mounting element of the actuating device 1 on which components of the actuating device 1 may be premounted and via which the premounted actuating device is subsequently fixed to the head restraint KS. The actuating device 1 in this case has a mounting element in the form of a mounting frame 11 on which the bearing cup 10 is immovably fixed and which surrounds the bearing cup 10 and the actuating knob B, so that the bearing cup 10 and the actuating knob B are arranged inside the mounting frame 11. t.

Figure 2A:
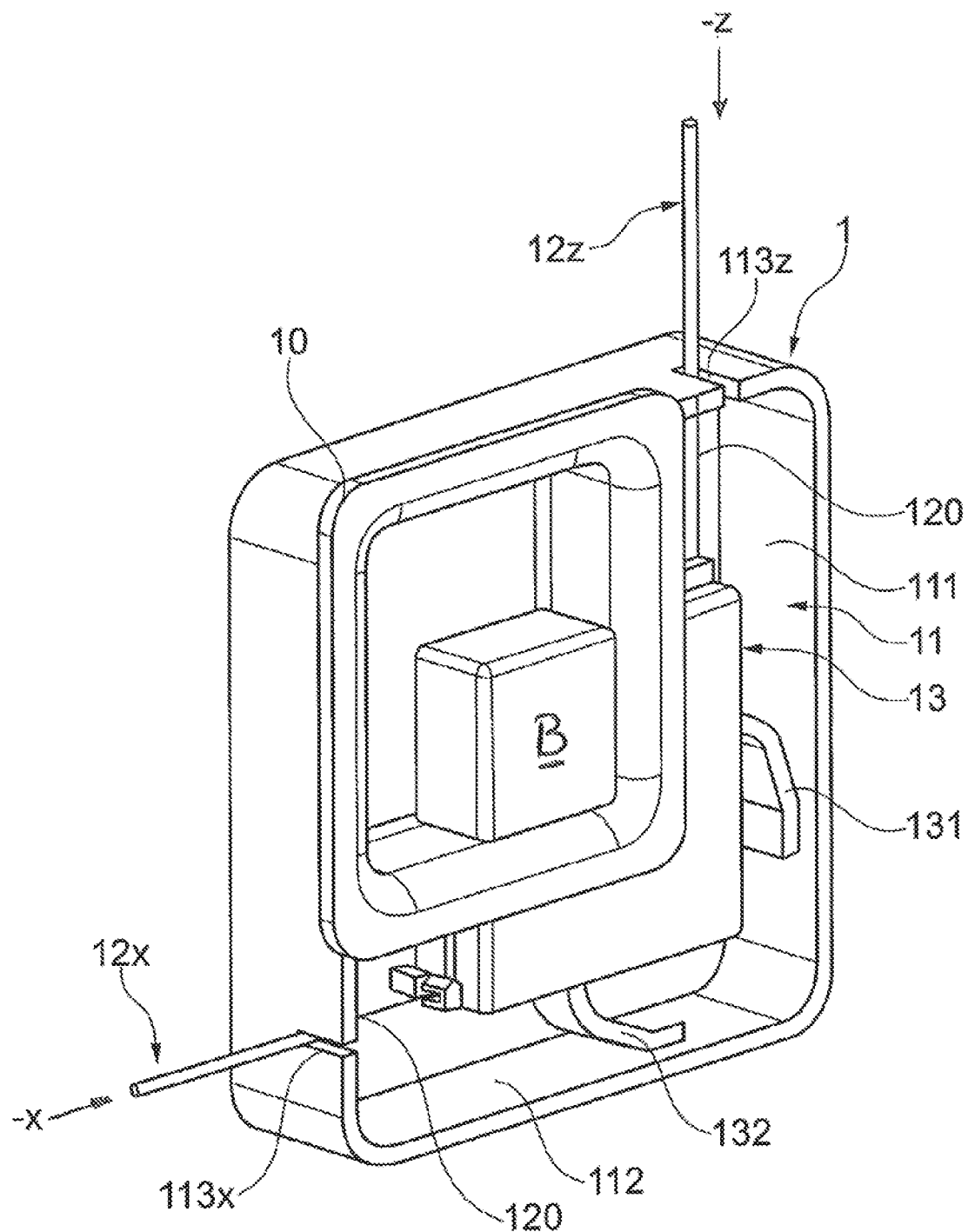
FIGS. 2A-2B show front and rear views of the actuating device of FIGS. 1 and 1A illustrating a mounting frame of the actuating device.
Figure 2B:
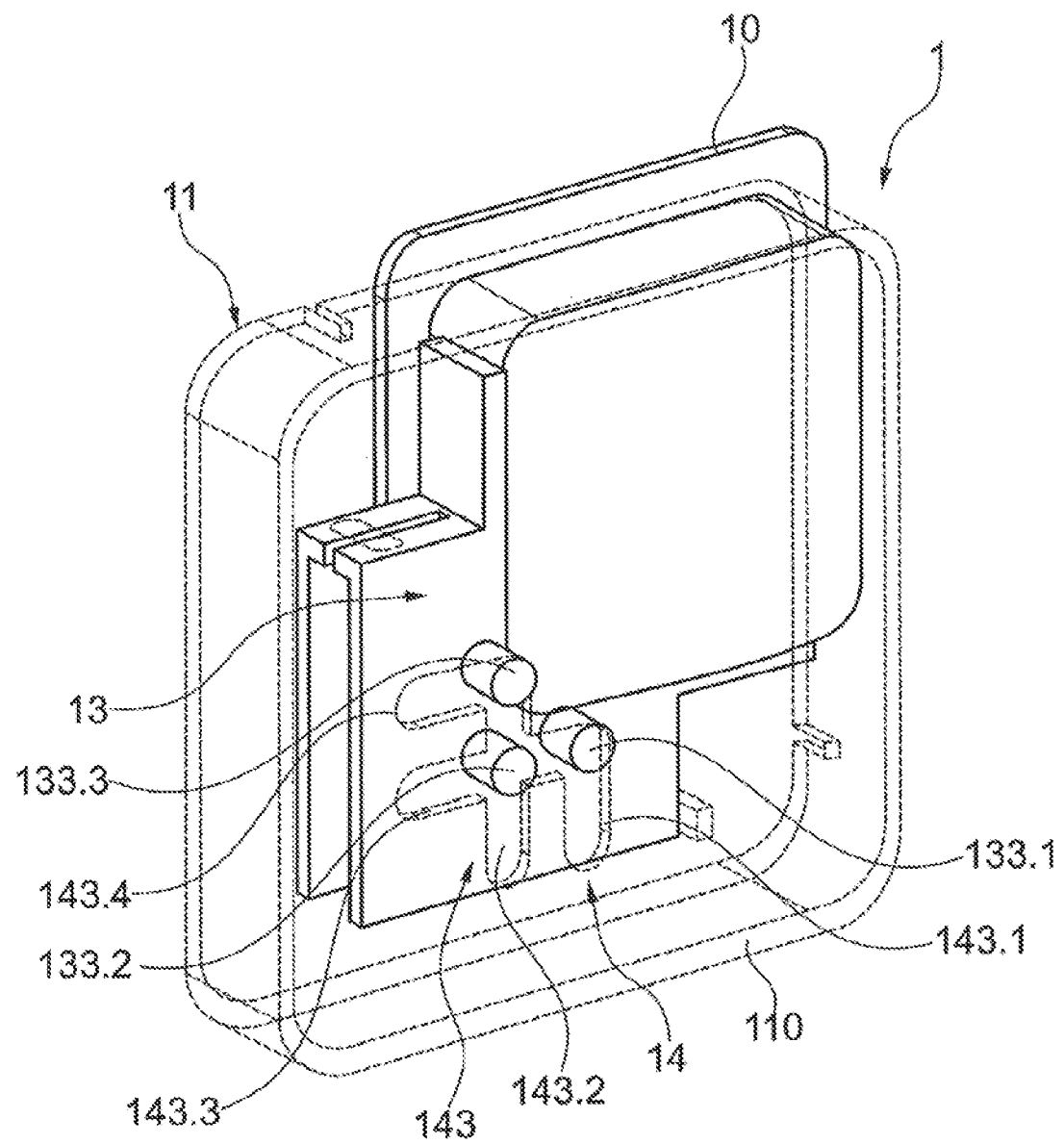

The actuating knob B in this case, in the variant of FIGS. 2A and 2B, is positioned in the neutral position in a corner of the rectangular bearing head 10 so that the actuating knob B is only accessible in a grip recess defined via the bearing cup 10 from two sides along the spatial axes X and Z, which coincide with the permitted actuating directions Bx and Bz. The actuating knob B is adjustably mounted relative to the bearing cup 10 and configured on a base body 13, This base body 13 protrudes into the bearing cup 10 with the actuating knob B on a corner of the rectangular bearing cup 10 via an L-shaped or V-shaped through-opening 101 in the walls of the bearing cup 10, In this case, the actuating knob B is at least partially displaceable from the fixed bearing cup 10 via the through-opening 101 from its illustrated neutral position in the spatial direction −x and the spatial direction −z in order to actuate the locking device.

For predetermining the neutral position of the actuating knob B the base body 13 is supported in a resilient manner via spring elements 131 and 132, in the form of spring tongues on two internal walls 111 and 112 of the mounting frame 11. Via the one spring element 131 the base body 13—and in turn thereby the actuating knob B—is resiliently supported relative to the first spatial axis X and pretensioned in the neutral position shown in FIG. 2A relative to this spatial axis in the −x direction. Via the further second spring element 132 accordingly the base body 13—and thereby once again the actuating knob B—is resiliently supported along the second spatial axis Z and pretensioned thereby in the −z direction. If, as a result, the actuating knob B for releasing a locking of the head restraint KS is intended to be displaced in one of the possible actuating directions Bx, Bz, a user acting on the actuating knob B has to overcome the restoring force applied respectively by a spring element 131 or 132. If the actuating knob B is no longer pressed by the user in one or the other actuating direction Bx or Bz, by the action of the spring elements 131, 132 together with the base body 13 said actuating knob is automatically pressed back into its neutral position.

In this case, a restoring movement of the base body 13 produced by the spring elements 131 and 132 and the actuating element B formed thereon is defined by two stop portions 134 and 135 of the base body 13. These stop portions 134 and 135 protrude as projections on the base body 13 and namely in different spatial directions +x and +z. Via a stop portion 134 or 135, an adjustment of the base body 13 and thus of the actuating knob B formed thereon is delimited in the +z direction, respectively the +x direction beyond the neutral position. To this end, the respective stop portion 134 and 135 in each case bears against a rear face of one of the walls of the bearing cup 10 edging the through-opening 101 and thus blocks a (further) adjustment beyond the neutral position. In this case, the stop portion 134 protruding in the +x direction defines an adjustment in the +z direction whilst the other stop portion 135 protruding in the +z direction delimits the adjustment in the +z direction.

For predetermining defined adjusting paths in the two spatial directions X and Z, along which the actuating knob B is adjustable relative to the bearing cup 10, the actuating device 1 has a guide device 14 with a sliding guide. The sliding guide in this case is formed by, in particular, a guiding slide 143, which is configured on a rear wall 110 of the mounting frame 11. A plurality of guide elements (in the present case three) in the form of guide pins 133.1, 133.2 and 133.3 of the base body 13 slidably engage in this guiding slide 143 of the mounting frame 11. In this case, the three guide pins 133.1 to 133.3 are arranged on a rear face of the base body 13 at the corner points of a virtual equilateral triangle and displaceably held in a plurality of slide fingers 143.1, 143.2, 143.3 and 143.4 of the guiding slide 143 extending perpendicular to one another. In this case, the total of four slide fingers 143.1 to 143.4 of the guiding slide 143 are arranged relative to one another and connected together such that the guiding slide has two U-shaped regions in which in each case two slide fingers 143.1/143.2 or 143.3/143.4 extend parallel to one another. In the correctly installed state of the actuating device 1 each pair of slide fingers 143.1/143.2 and 143.3/143.4 extends parallel to one of the spatial axes X or Z and thus predetermines an adjusting path for the actuating knob B along the respective spatial axis X or Z. In this case, respectively at least two of the guide pins 133.1 to 133.3 may be inserted into a pair of slide fingers 143.1/143.2 or 143.3/143.4 if the actuating knob B is intended to be displaced from its neutral position.

By the respective displacement in the actuating directions Bx or Bz, in the spatial directions –x or –z, in the present case an adjusting force is transmitted onto the one locking device or to different locking devices. The transmission of the adjusting force and the mechanical coupling of the actuating device 1 with a locking device of the head restraint arrangement is implemented, for example, by means of a flexible traction means in the form of a Bowden cable 12x or 12z. Each of the two Bowden cables 12x, 12z provided in the variants shown is fixed with one end to the base body 13. If, as a result, the base body 13 is displaced from its neutral position in a spatial direction –x or –z by a displacement of the actuating knob B, a pulling force acts via the respective core 120 of a Bowden cable 12x or 12z. As a result, an actuation of the associated locking device takes place and thus an unlocking of the head restraint KS along the respective spatial axis X or Z. For guiding the two Bowden cables 12x and 12z from the interior of the mounting frame 11 in which the base body 13 is accommodated, guide slots 113x and 113z are provided on two side walls of the mounting frame 11.

Figure 3B:
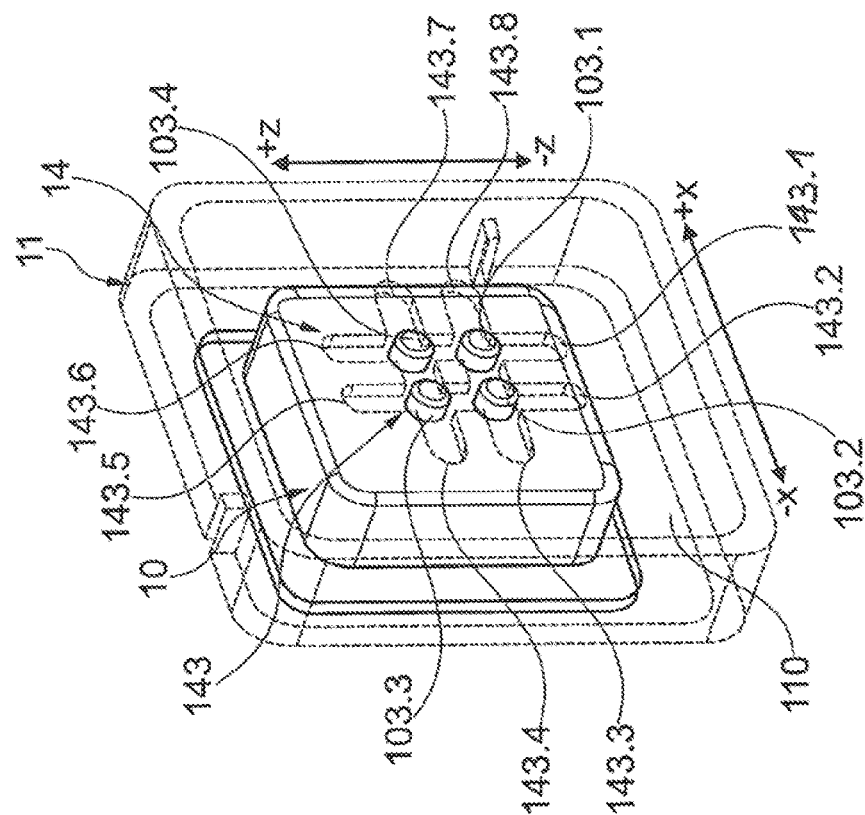
FIGS. 3A-3B show front and rear views of a further variant of the actuating device with the mounting frame.
Figure 3A:
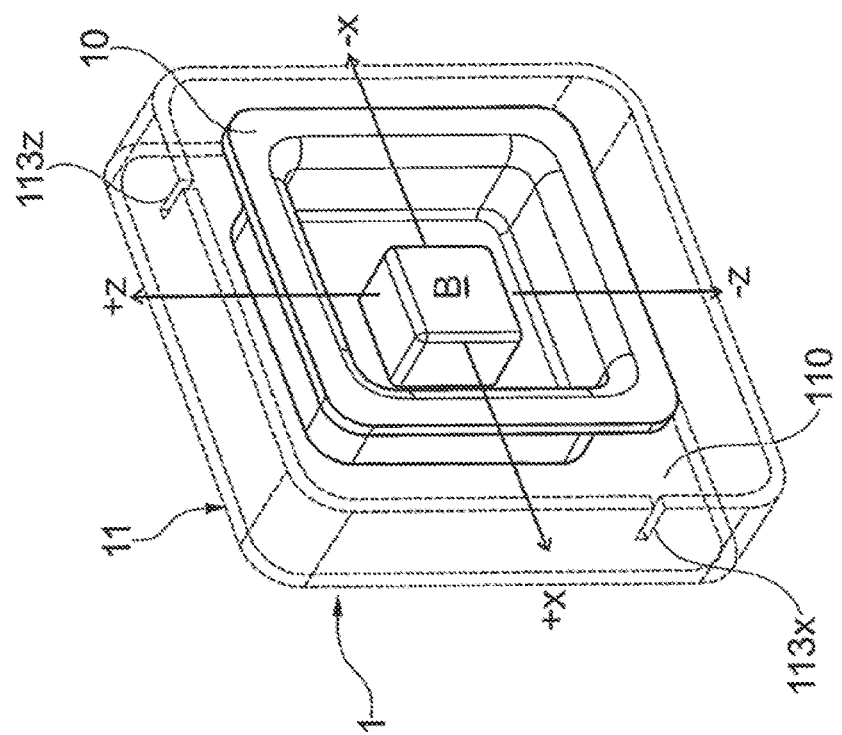

An alternative variant is illustrated by FIGS. 3A and 3B, in which the predetermining of the possible adjusting paths for the actuating knob B is achieved via a sliding guide which has a guiding slide 143 with a double cross-shaped path on the rear wall 110 of the mounting frame 11. In this case, four guide pins 103.1, 103.2, 103.3 and 103.4 which are arranged at the corner points of a virtual square are configured on the rear wall of the bearing head 10 as part of the sliding guide. These guide pins 103.1 to 103.4 engage in the guiding slide 143 and are held slidably therein. Via the double cross-shaped path of the guiding slide with a total of four pairs of slide fingers 143.1/143.2, 143.3/143.4, 143.5/143.6 and 143.7/143.8 in this case the bearing cup 11 is displaceable with the actuating knob B which is immovably arranged centrally therein—in the manner of a joystick—from a neutral position along both spatial axes X and Z and in this case in both opposing spatial directions –x and +x and –z and +z in order to release a locking of the head restraint KS. In this case, as a result, the actuating knob B (together with the bearing cup 10 to which the actuating knob B is rigidly connected) is selectively displaced along the respective spatial axis X or Z in the spatial direction –x, +x, –z or +z, in which after releasing the locking an adjustment of the head restraint KS is also intended to take place.

So that the locking is automatically locked again when a user no longer acts on the actuating knob B, a pretensioning of the actuating knob B into a neutral positon may also be provided in the variant of FIGS. 3A and 3B. For example, to this end the bearing cup 10 is resiliently supported on the mounting frame 11. For example, to this end four spring elements may be provided via which the bearing cup 10 is resiliently supported on all four inner walls of the mounting frame 11 which is substantially rectangular in cross section.

Different variants are illustrated with reference to FIGS. 4A-4B, 5-5B, 6A-6B, 7A-7B and 8A-8B relative to how a displacement movement of the actuating knob B may be combined with an unlocking of the head restraint KS and, in particular, with the adjustment movement of the head restraint KS permitted thereby.

Figure 4B:
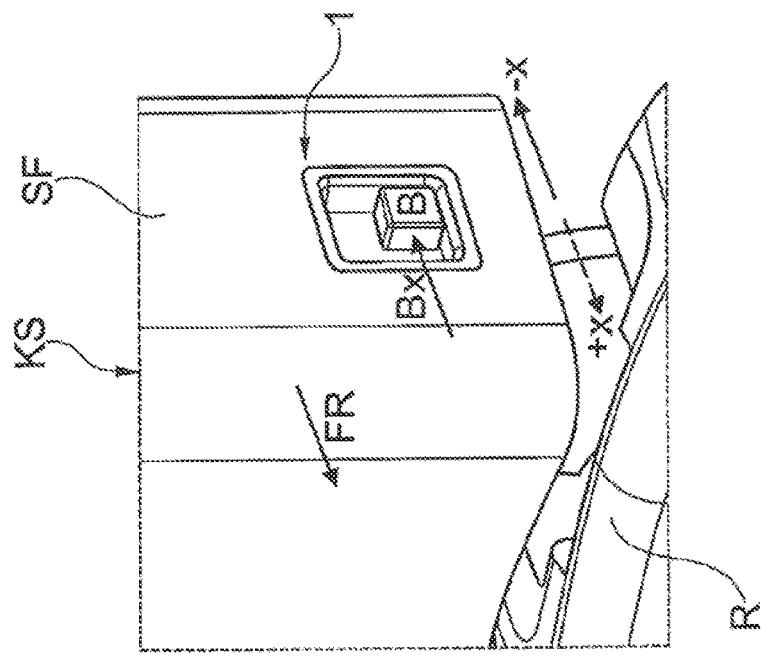
FIGS. 4A-4B shows in views coinciding with FIG. 1A an illustration of different dependencies for the displacement of the actuating element and the locking to be released thereby along a first spatial axis.
Figure 4A:
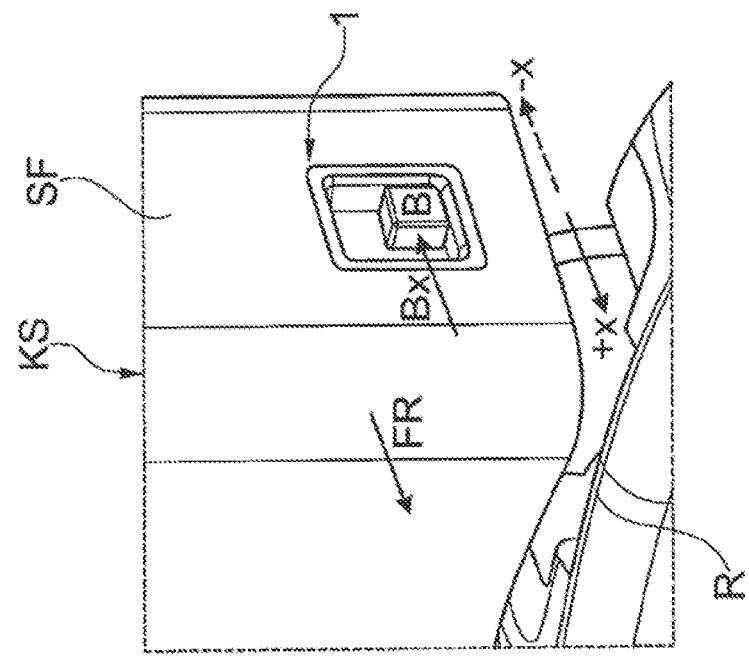

In the variants of FIGS. 4A and 4B, for example, it is provided that by an actuation of the actuating knob B along the spatial axis X in the actuating direction Bx, the head restraint KS is only unlocked in one of the spatial directions +x, –x along the spatial axis X. In the respective other opposing spatial direction an adjustment of the head restraint KS is also possible without actuating the actuating device 1 (direction shown in dashed lines). In FIG. 4A the head restraint KS, for example, is adjustable to the rear in the spatial direction –x without being released via the actuating knob B which has to be displaced. Merely for an adjustment of the head restraint KS to the front in the spatial direction +x, the actuating knob B has to be displaced in the opposing direction on the side surface SF. In the variant of FIG. 4B it is exactly the reverse. Here an adjustment of the head restraint KS to the rear in the spatial direction –x is only possible by displacing the actuating knob B in the same spatial direction, whereas a displacement of the head restraint KS to the front in the spatial direction +x is irrespective of an actuation of the actuating knob B.

Figure 5B:
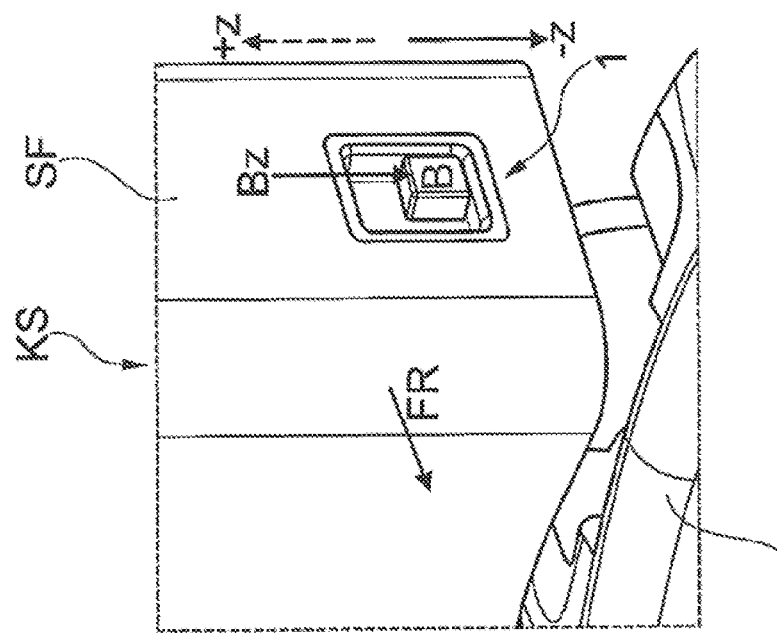
FIGS. 5A-5B show in views coinciding with FIG. 1A an illustration of different dependencies for the displacement of the actuating element and the locking to be released thereby along a second spatial axis.
Figure 5A:
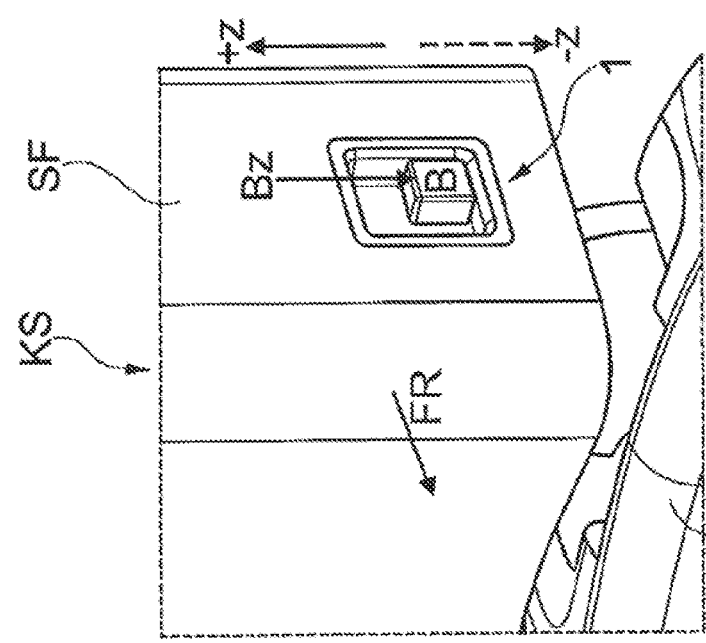

In the variant of FIG. 5A and FIG. 5B, the concept of FIGS. 4A and 4B for the adjustment of the head restraint KS along the vertical axis or spatial axis Z is illustrated. A displacement of the actuating knob B on the side surface SF downwardly in the spatial direction –z is only necessary here in order to be able to adjust the head restraint KS either upwardly (FIG. 5A) or downwardly (FIG. 5B).

Figure 6B:
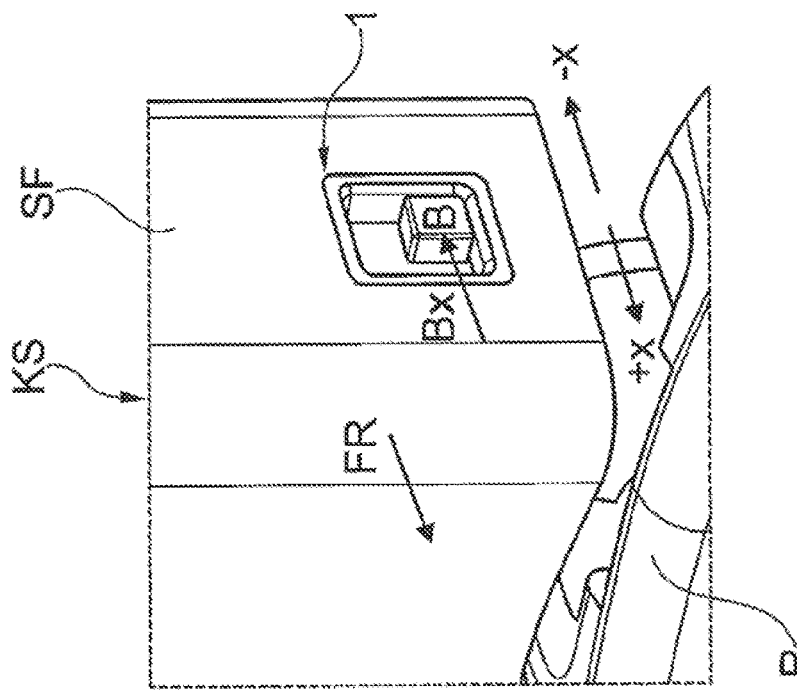
FIGS. 6A-6B show in views coinciding with FIG. 1A an illustration of different dependencies for the displacement of the actuating element and the locking to be released thereby along the first and second spatial axis.
Figure 6A:
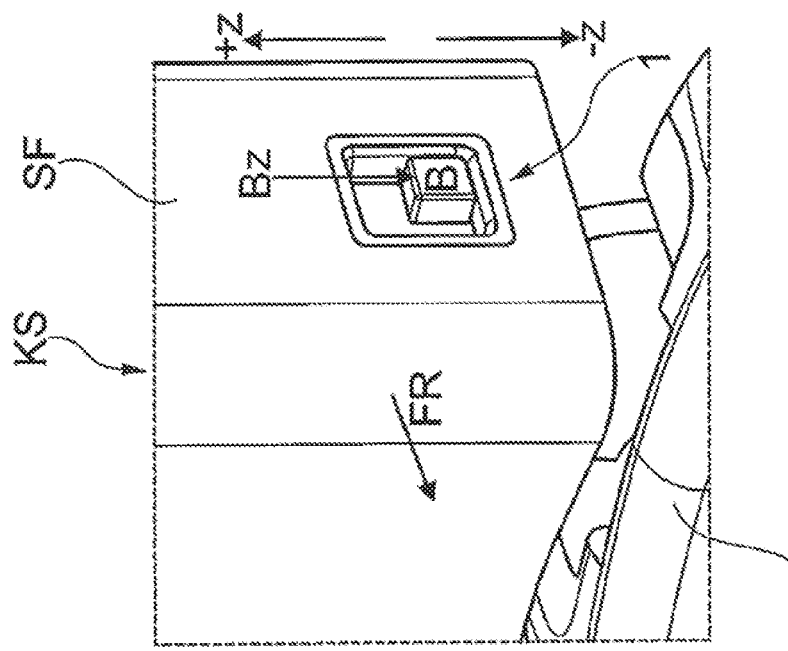

In the variant of FIGS. 6A and 6B a displacement of the actuating knob B both along the spatial axis X and also along the spatial axis Z is necessary (in the respective spatial direction –x or –z) in order to permit an adjustment of the head restraint KS along the respective spatial axis X or Z.

Figure 7B:
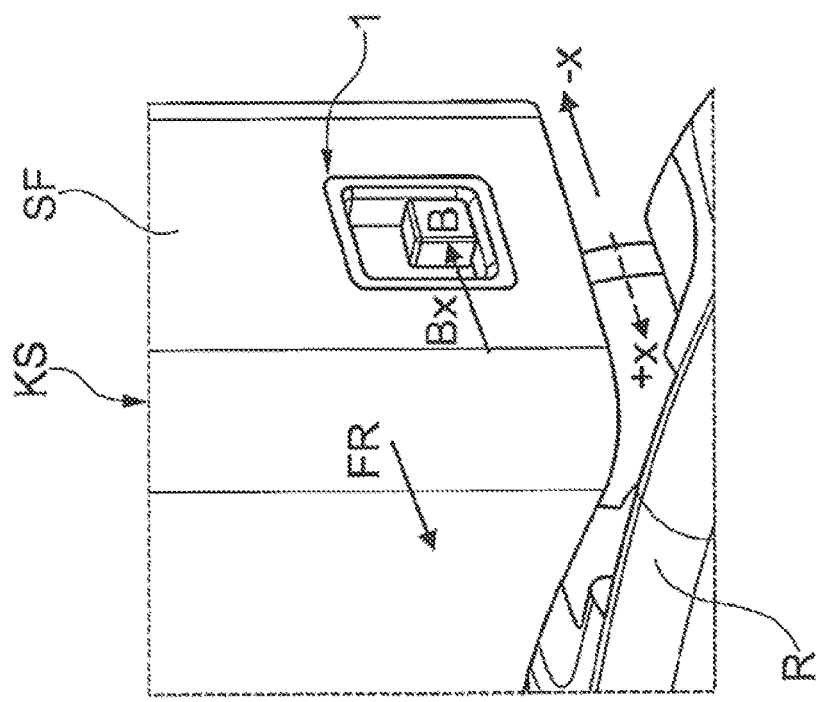
FIGS. 7A-7B illustrate a possible alternative to the variant of FIGS. 6A and 6B.
Figure 7A:
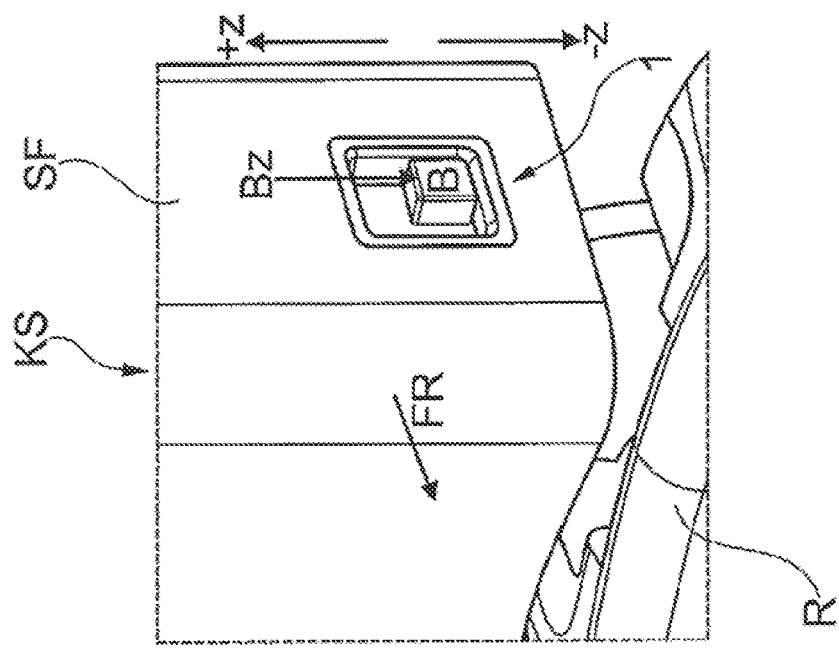

In contrast thereto, the variant of FIGS. 7A and 7B provides that whilst for a vertical adjustment of the head restraint KS a displacement of the actuating knob B downwardly also has to be carried out in the spatial direction –z, for setting the longitudinal position of the head restraint KS to the front in the spatial direction +x no displacement of the actuating knob B is required. Only for an adjustment of the head restraint KS to the rear does the actuating knob B also have to be displaced to the rear in the spatial direction –x.

Figure 8B:
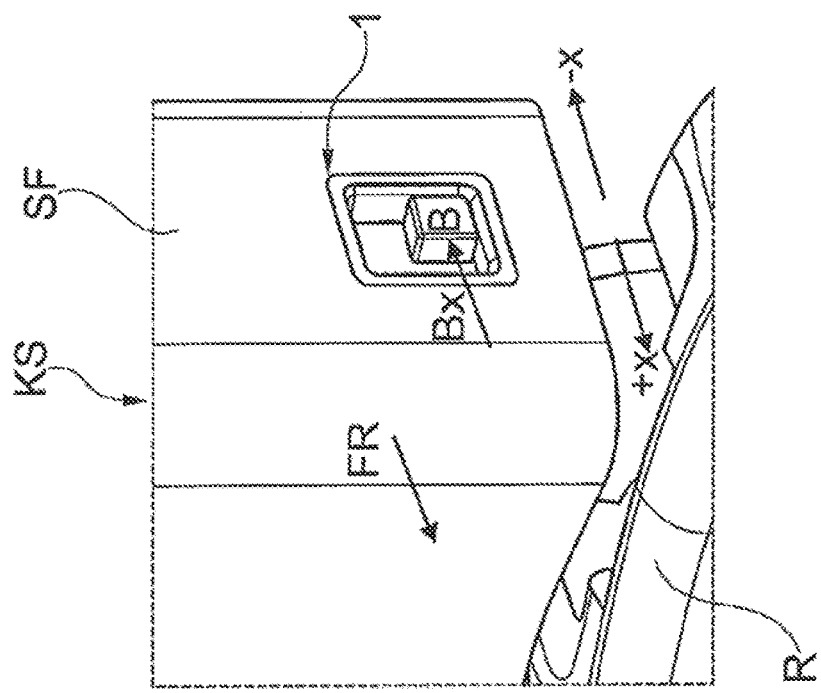
FIGS. 8A-8B illustrate a further alternative to the variant of FIGS. 6A and 6B.
Figure 8A:
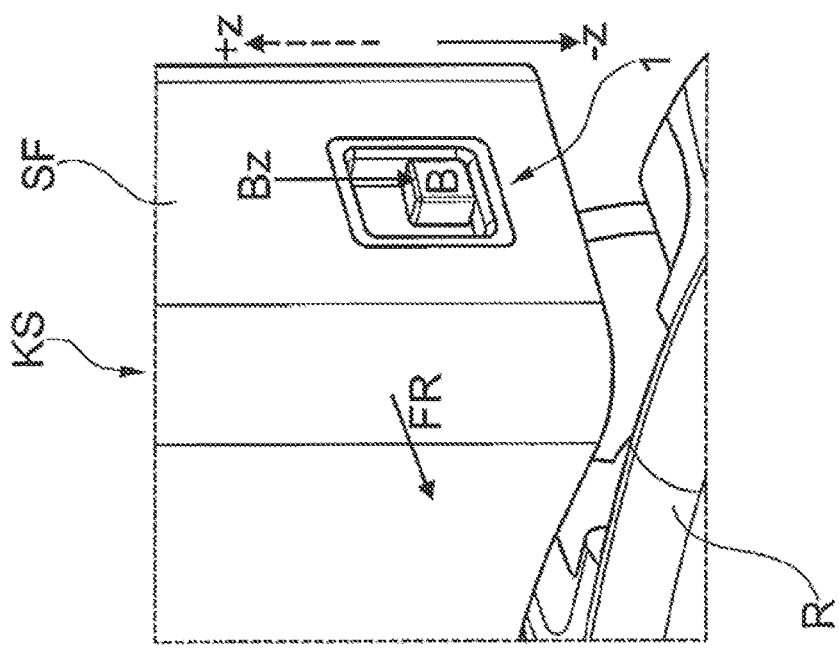
Figure 9B:
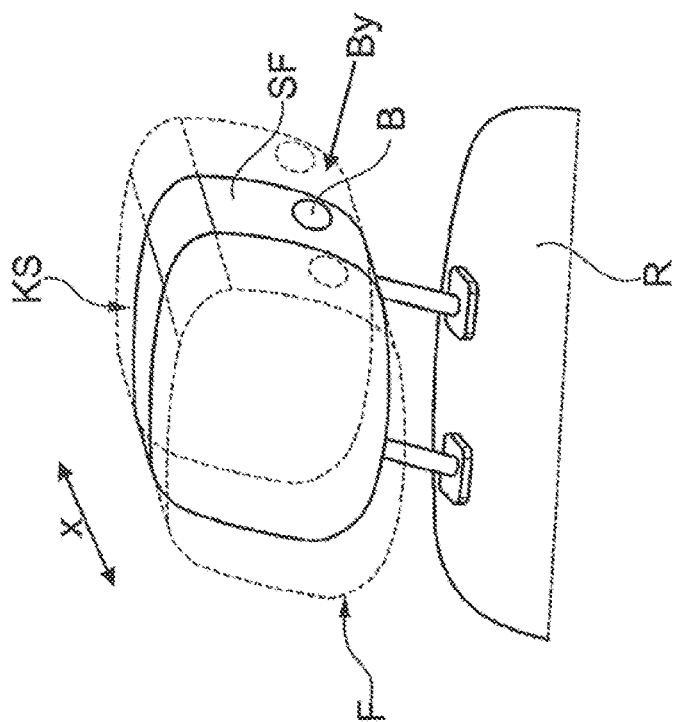
Figure 9A:
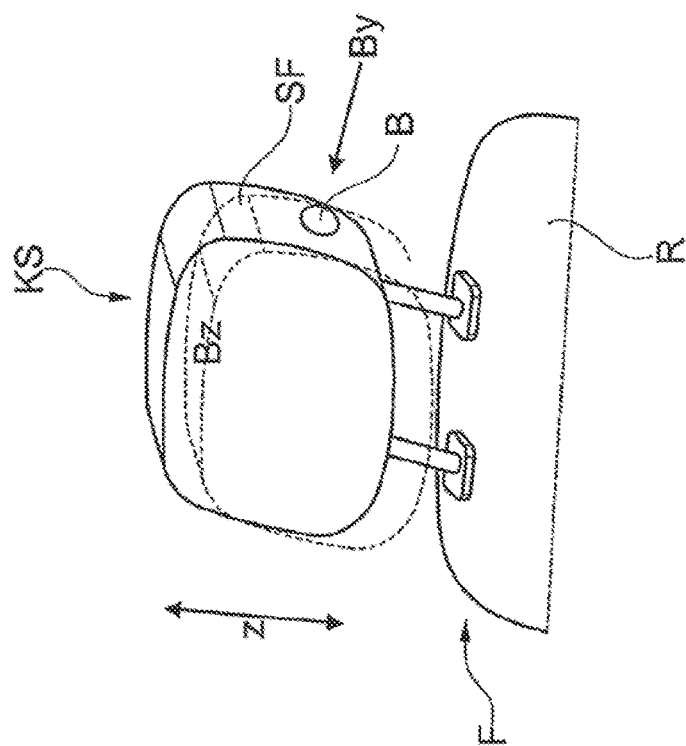

In the variant of FIGS. 8A and 8B, however, the blocking of the head restraint KS along the spatial axis Z for the vertical adjustment is different according to the adjusting direction. Thus a displacement of the actuating knob B downwardly is only absolutely necessary for lowering the head restraint KS. A vertical adjustment of the head restraint KS in the spatial direction +z, however, is irrespective of a displacement of the actuating knob B. Here it is sufficient if a user pulls or pushes the head restraint KS upwardly with sufficient force.

LIST OF REFERENCE NUMERALS

1 Actuating device
10 Bearing cup (bearing element)
101 Through-opening
103.1-103.4 Guide pin (guide element)
11 Mounting frame (mounting element)
110 Rear wall
111, 112 Inner wall
113$x$, 113$z$ Guide slot
12$x$, 12$z$ Bowden cable
120 Core
13 Base body
131, 132 Spring element
133.1-133.3 Guide pin (guide element)
134, 135 Projection/bearing portion
14 Guide device
143 Guiding slide
143.1-143.8 Slide finger (slide portion)
B Actuating knob (actuating element)
Bx, By, Bz Actuating direction
F Vehicle seat
FR Direction of travel
KS Head restraint
R Backrest
SF Side surface

The invention claimed is:

1. A head restraint arrangement for a vehicle seat, the head restraint arrangement comprising:
a head restraint which is adjustable along two spatial axes; and
an actuating device, via which at least one locking device which, in a locked state, blocks the head restraint against adjustment in at least one spatial direction along one of the spatial axes, is manually actuatable in order to remove a block and to permit an adjustment of the head restraint, wherein the actuating device comprises an actuating element which is provided on the head restraint and, for actuation of the locking device, is mounted displaceably along at least one of the spatial axes,
wherein, for actuating the locking device, the actuating element is displaceable along a spatial axis in a spatial direction in which the head restraint is adjustable in an unlocked state of the locking device.

2. The head restraint arrangement as claimed in claim 1, wherein the actuating element is displaceable along both spatial axes.

3. The head restraint arrangement as claimed in claim 1, wherein in a locked state the at least one locking device blocks the head restraint along a spatial axis merely against an adjustment in one of two opposing spatial directions.

4. The head restraint arrangement as claimed in claim 1, wherein in a locked state the at least one locking device blocks the head restraint along a spatial axis against an adjustment in both opposing spatial directions.

5. The head restraint arrangement as claimed in claim 1, wherein the actuating element is mounted displaceably via at least one sliding guide.

6. The head restraint arrangement as claimed in claim 1, wherein the actuating element is pretensioned via at least one spring element into a neutral position from which the actuating element has to be displaced for actuating the at least one locking device in order to remove a block.

7. The head restraint as claimed in claim 6, wherein the actuating element is displaceable along both spatial axes, wherein the actuating element is pretensioned along both spatial axes by means of at least two spring elements into the neutral position.

8. The head restraint arrangement as claimed in claim 6, wherein the at least one spring element is supported on a mounting element of the actuating device which surrounds at least the actuating element with a portion in the manner of a frame and the actuating device being fixed thereby to the head restraint.

9. The head restraint arrangement as claim 1, wherein the actuating element is arranged in an opening or a recess of a bearing element of the actuating device.

10. The head restraint arrangement as claimed in claim 9, wherein the actuating element and the bearing element are displaceable relative to one another or together.

11. The head restraint arrangement as claimed in claim 9, wherein the actuating element and the bearing element are displaceable relative to one another or together, wherein at least one guide element is provided on the bearing element or an element connected rigidly to the actuating element or configured therewith, said guide element being slidably guided in a guiding slide of the sliding guide.

12. The head restraint arrangement as claimed in claim 11, wherein the guiding slide is configured on a mounting element of the actuating device, said mounting element surrounding at least the actuating element with a portion in the manner of a frame and/or the actuating device being fixed thereby to the head restraint.

13. The head restraint arrangement as claimed in claim 1, wherein at least one Bowden cable, is provided, for the actuation of the locking device, the Bowden cable being configured to transmit an adjusting force manually applied to the actuating element to the at least one locking device.

14. A head restraint arrangement for a vehicle seat, the head restraint arrangement comprising:
a head restraint which is adjustable along two spatial axes; and
an actuating device, via which at least one locking device which, in a locked state, blocks the head restraint against adjustment in at least one spatial direction along one of the spatial axes, is manually actuatable in order to remove a block and to permit an adjustment of the head restraint, wherein the actuating device comprises an actuating element which is provided on the head restraint and, for actuation of the locking device, is mounted displaceably along at least one of the spatial axes,
wherein for actuating the locking device the actuating element is displaceable along a spatial axis in a spatial direction which runs opposite the spatial direction in which the head restraint is adjustable in an unlocked state of the locking device.

15. A head restraint arrangement for a vehicle seat, the head restraint arrangement comprising:
a head restraint which is adjustable along two spatial axes; and
an actuating device, via which at least one locking device which, in a locked state, blocks the head restraint against adjustment in at least one spatial direction along one of the spatial axes, is manually actuatable in order to remove a block and to permit an adjustment of the head restraint, wherein the actuating device comprises an actuating element which is provided on the head restraint and, for actuation of the locking device, is mounted displaceably along at least one of the spatial axes,
wherein the actuating element is mounted displaceably via at least one sliding guide and a guiding slide of the sliding guide has at least two slide portions extending substantially perpendicular to one another.

16. The head restraint arrangement as claimed in claim 15, wherein a guiding slide of the sliding guide has at least in one region an H-shaped, h-shaped, F-shaped, U-shaped or double cross-shaped path.

* * * * *